Dec. 6, 1949  S. BLOOMFIELD  2,490,615
NUT CRACKER WITH RACK AND PAWL ADJUSTING MEANS
Filed Oct. 22, 1945

INVENTOR.
Samuel Bloomfield
BY
ATTORNEY.

Patented Dec. 6, 1949

2,490,615

UNITED STATES PATENT OFFICE 2,490,615

NUTCRACKER WITH RACK AND PAWL ADJUSTING MEANS

Samuel Bloomfield, Wichita, Kans., assignor to C. Earl Hovey, Kansas City, Mo., as trustee Application October 22, 1945, Serial No. 623,639

1 Claim. (Cl. 146—13)

This invention relates to nut crackers of the hand operated type and has for its primary aim the provision of such a tool, wherein is incorporated effective and positively acting means for limiting the crushing action of the cracker, to the end that the meat of the nut being acted upon, will not be mutilated.

Another important aim of this invention is to provide a nut cracker of the aforementioned character, having self-adjusting structure for limiting the movement of the jaws of the tool toward each other after a nut has been positioned therein.

This invention has for a further and important object to provide a nut cracker of the hand operated type with nut engaging jaws, the character whereof insures movement toward each other of a limiting nature, the starting point of which movement is controlled by the size of the nut being cracked.

Other objects of the invention including one selected form of embodying the same in a hand operated tool, will appear during the course of the specification, referring to the accompanying drawing, wherein.

Nut crackers of the general type embodying this invention have been heretofore employed, but no means other than the discretion of the operator has been utilized to limit the crushing action of the jaws of the cracker so that the meat of the nut is protected.

In the form of the invention chosen for illustration, adequate and positively acting structure is shown for preventing destructive action to the meat of the nut, which structure is automatically set when the nut is introduced between the jaws of the tool.

A pair of articulated jaws 10 and 12 respectively, are joined by link 14 to which jaws 10 and 12 are pivotally connected by pintles 16 and 18.

Figure 1:
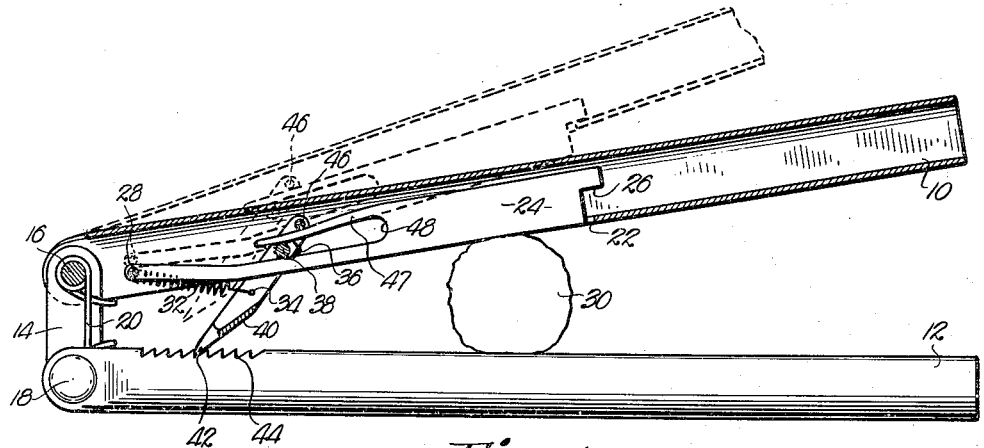
Fig. 1 is a side elevational view of a nut cracker made in accordance with the present invention and showing one jaw thereof in longitudinal section to reveal the movement-limiting structure.
Figure 2:
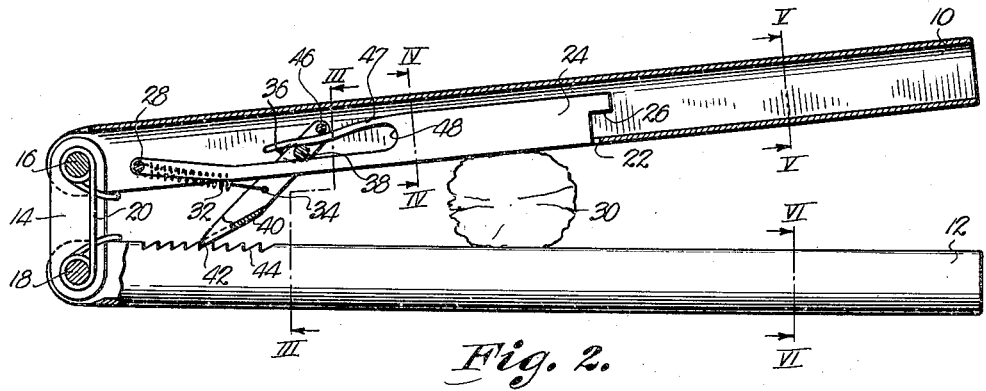
Fig. 2 is a side elevational view of the nut cracker showing the jaws thereof at the extreme end of their movement toward the nut as it is being treated.

Jaws 10 and 12 are yieldably urged apart by spring 20, the character whereof is clearly shown in Figs. 1 and 2, and which is coiled about pintles 16 and 18 for support as the laterally disposed fingers engage the inner proximal faces of the two jaws.

Figure 3:
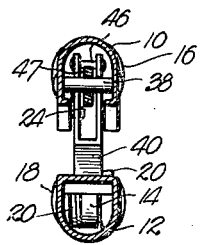
Fig. 3 is a cross sectional view taken on line III—III of Fig. 2 and looking in the direction of the arrows.
Figure 4:
Fig. 4 is a fragmentary detailed sectional view taken on line IV—IV of Fig. 2.
Figure 5:
Fig. 5 is a cross sectional view taken on line V—V of Fig. 2.
Figure 6:
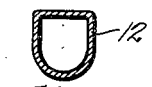
Fig. 6 is a similar cross sectional view but taken on line VI—VI of Fig. 2.

Jaw 10 is tubular in cross section, as shown in Figs. 3, 4 and 5, but has a longitudinal slot 22 provided therein for the reception of an arm 24 formed as illustrated in Figs. 1 and 2. This arm 24 is provided with a shoulder 26 to prevent accidental displacement with respect to its normally housed position within hollow jaw 10, and while shoulder 26 is at one end of arm 24, it is pivotally supported by a pin 28 at the other end thereof. This pin extends transversely across jaw 10 from one leg thereof to the other, and it is about the axis of this pin that arm 24 is moved when a nut 30 is introduced for cracking.

A spring 32 having one end anchored on pin 28 and its opposite end anchored as at 34 to pawl 40, holds said pawl 40 in the retracted normal position.

Jaw 10 is provided with opposed slots 36 formed in each of two opposed side walls and a transverse pin 38 supporting pawl 40 is slidably supported within these said slots.

Pawl 40 is tapered to a point 42 movable into engagement with one of a number of teeth 44 provided along the inner face of jaw 12. This pawl 40 is likewise bifurcated to present a pair of legs straddling arm 24, which legs are joined by link 46 to slide along the upper edge of arm 24, as clearly illustrated in Figs. 2 and 3.

An attenuated notch 48 formed in arm 24 extends inwardly from its forward end in the fashion shown in Figs. 1 and 2, and in addition to slidably entering slots 36, pin 38 extends through notch 48.

The structure just defined and including arm 24 and pawl 40 with associated parts, constitutes the means for limiting the movement of the jaws to a prescribed path after the nut 30 has been introduced between jaws 10 and 12.

In operation, jaws 10 and 12 are yieldably held in an extended or parted condition by spring 20, and when nut 30 is introduced, it engages the lower edge of arm 24 which is elevated or moved back into the hollow jaw 10 to engage link 46 and swing the pointed end of pawl 40 into one of the notches 44, depending upon the diameter of nut 30, and therefore, the distance between jaws 10 and 12. In such condition, the parts are as illustrated in full lines of Fig. 1. Spring 32 has held pin 38 at the forward end of the slot during this setting operation.

Inward pressure on the free ends of jaws 10 and 12 will crack nut 30 as the jaws are moved together a distance allowed by the length of slots 36. When pin 38 has reached the rear end of slot 36 opposite to its point of beginning, the parts will be as shown in Fig. 2. Nut 30 will have been cracked by a fracturing operation on the shell thereof, but further movement of jaws 10 and 12 toward each other cannot occur to crush or mutilate the kernels of the nut. The resiliency of finger 47 permits link 46 to travel from the position shown in dotted lines of Fig. 1, to the position illustrated in Fig. 2, while pin 38 moves from one end to the other of slot 36.

Pawl 40 serves to limit the inward movement of jaws 10 and 12 and in the event further crushing action is necessary, all that need be done is to repeat the operation just described. Only short movement will be permitted by the structure interconnecting jaws 10 and 12, and therefore, full protection of the nut meats is afforded. Obviously, the size of the nut determines the position of pawl 40 in teeth 44, and no special attention need be given the setting means by the operator, other than through the mere introduction of the nut between jaws 10 and 12.

When the crushed nut is removed from between jaws 10 and 12, arm 24 will return to a normal position with shoulders 26 against the inner wall of jaw 10. The flexible finger 47 will straighten and spring 32 will draw pin 38 to the forward end of slot 36 where it remains until a nut is introduced between arm 24 and jaw 12 to again swing the upper end of pawl 40 around the axis of pin 38 to bring point 42 into engagement with a notch 44.

Having thus described the invention, what is claimed as new and desired to be secured by Letters Patent is:

A nut cracker of the hand operated type comprising a pair of elongated jaws articulated at one end and adapted to receive a nut to be cracked therebetween; a toothed rack on the innermost face of one of said jaws adjacent said one end thereof and extending longitudinally thereof; a pawl swingably and slidably mounted on the other of said jaws and extending toward said rack for engagement with the teeth thereof as the jaws are moved together whereby to limit movement of said jaws together, the extent of said movement of the jaws being dependent upon the tooth of said rack that is engaged by said pawl; and an arm swingably carried by said other jaw and engageable with said pawl for swinging and sliding and thereby varying the position of the latter with respect to said rack as the arm is swung, said arm being disposed for engagement with and movement by said nut to be cracked when disposed between the jaws and as the jaws are moved toward each other to crack the nut, whereby the positioning of said pawl is determined by the size of nut being cracked, said arm having parts capable of yielding after the jaws have been moved against the nut to operate the arm and position the pawl for engagement with said rack, whereby to permit further movement of said jaws toward each other to crack the nut.

SAMUEL BLOOMFIELD.

REFERENCES CITED

The following references are of record in the file of this patent:

UNITED STATES PATENTS

| Number | Name | Date |
|---|---|---|
| 1,041,531 | Wachowiez | Oct. 15, 1912 |
| 1,436,571 | Bokor | Nov. 21, 1922 |